(12) United States Patent
Tran (10) Patent No.: US 7,948,404 B2
(45) Date of Patent: May 24, 2011

(54) OBSTACLE AVOIDANCE SITUATION DISPLAY GENERATOR

(75) Inventor: My Tran, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 752 days.

(21) Appl. No.: 11/672,397

(22) Filed: Feb. 7, 2007

(65) Prior Publication Data

US 2007/0182589 A1    Aug. 9, 2007

Related U.S. Application Data

(63) Continuation-in-part of application No. 11/019,781, filed on Dec. 21, 2004, now Pat. No. 7,236,104, which is a continuation of application No. 10/446,526, filed on May 27, 2003, now Pat. No. 6,873,269.

(51) Int. Cl.
    *G08G 5/04* (2006.01)
(52) U.S. Cl. ............. 340/961; 340/945; 701/14; 342/29
(58) Field of Classification Search .................. 340/945, 340/961, 963; 701/14, 120, 301; 342/29, 342/32, 65
    See application file for complete search history.

(56) References Cited

U.S. PATENT DOCUMENTS

| 4,916,448 | A |   | 4/1990 | Thor ............................... 340/970 |
| 5,111,400 | A | * | 5/1992 | Yoder ................................ 701/3 |
| 5,382,954 | A | * | 1/1995 | Kennedy et al. ............... 340/961 |
| 5,631,640 | A | * | 5/1997 | Deis et al. ...................... 340/961 |
| 5,883,586 | A |   | 3/1999 | Tran et al. ...................... 340/945 |
| 5,892,462 | A |   | 4/1999 | Tran ............................... 340/961 |
| 6,154,151 | A | * | 11/2000 | McElreath et al. ............ 340/970 |
| 6,182,005 | B1 |  | 1/2001 | Pilley et al. .................... 701/120 |
| 6,262,679 | B1 |  | 7/2001 | Tran ................................ 342/29 |
| 6,262,697 | B1 |  | 7/2001 | Stephenson ..................... 345/43 |
| 6,308,132 | B1 | * | 10/2001 | Wilson et al. ................. 701/200 |
| 6,480,120 | B1 |  | 11/2002 | Meunier ........................ 340/970 |
| 6,531,978 | B2 |  | 3/2003 | Tran ................................ 342/29 |
| 6,584,383 | B2 |  | 6/2003 | Pippenger ......................... 701/3 |
| 6,646,588 | B2 |  | 11/2003 | Tran ................................ 342/29 |
| 6,778,906 | B1 |  | 8/2004 | Hennings et al. ............. 701/301 |

(Continued)

FOREIGN PATENT DOCUMENTS

EP    1 462 767 A1    9/2004

(Continued)

OTHER PUBLICATIONS

European Search Report for 08101276.7-1248 dated May 27, 2008.

*Primary Examiner* — George A Bugg
*Assistant Examiner* — Edny Labbees
(74) *Attorney, Agent, or Firm* — Shumaker & Sieffert, P.A.

(57) ABSTRACT

A display generator for providing obstacle avoidance guidance to a pilot is described. The display generator receives data from an obstacle avoidance dispatcher and resolver module, a hybrid ground collision avoidance module, a hybrid air collision avoidance module, a display control panel, and a navigation management module. The display generator generates obstacle avoidance display image video data, which includes symbology that represents a location of one of a predicted ground collision, a predicted air collision, and an induced collision. The display generator provides the obstacle avoidance display image video data to an image rendering device, which a pilot can use to avoid both air and ground obstacles.

18 Claims, 10 Drawing Sheets

U.S. PATENT DOCUMENTS

| | | | |
|---|---|---|---|
| 6,795,772 B2 * | 9/2004 | Lin et al. | 701/301 |
| 6,873,269 B2 | 3/2005 | Tran | 340/961 |
| 7,095,338 B2 * | 8/2006 | Naimer et al. | 340/907 |
| 2001/0013836 A1 * | 8/2001 | Cowie | 340/961 |
| 2002/0149599 A1 | 10/2002 | Dwyer et al. | 345/592 |
| 2004/0107027 A1 | 6/2004 | Boudrieau | 701/1 |
| 2004/0239529 A1 | 12/2004 | Tran | 340/961 |
| 2005/0004723 A1 | 1/2005 | Duggan et al. | 701/24 |
| 2005/0066275 A1 | 3/2005 | Gannon | 715/700 |
| 2006/0273929 A1 | 12/2006 | Tran | 340/961 |
| 2006/0287827 A1 | 12/2006 | Tran | 701/301 |
| 2007/0018887 A1 | 1/2007 | Feyereisen et al. | 342/176 |

FOREIGN PATENT DOCUMENTS

| | | |
|---|---|---|
| GB | 2 367 965 | 4/2002 |
| WO | WO 00/39775 A3 | 7/2000 |

* cited by examiner

OBSTACLE AVOIDANCE SITUATION DISPLAY GENERATOR

RELATED APPLICATIONS

The present patent application is a continuation-in-part of U.S. patent application Ser. No. 11/337,212, which was filed Jan. 20, 2006 and is a continuation-in-part of U.S. patent application Ser. No. 11/019,781, which was filed Dec. 21, 2004 and is a continuation of U.S. Pat. No. 6,873,269. The full disclosures of U.S. patent application Ser. No. 11/337,212, U.S. patent application Ser. No. 11/019,781, and U.S. Pat. No. 6,873,269 are incorporated herein by reference.

FIELD

The present invention relates generally to a situation display generator, and more particularly, relates to a display generator that can provide a display image of an aircraft situation relative to "air-to-ground" and "air-to-air" obstacle situations.

BACKGROUND

Obstacle collision caused by either a controlled flight into terrain or colliding with another aircraft is a recurring problem for both commercial and military aircraft, even with a ground avoidance system and/or an air avoidance system installed in the aircraft. The probability of encountering obstacle collision problems increases when military aircraft operate in a tactical environment (e.g., fast tempo, low altitude, mixed mode operations). Additionally, the probability increases for all aircraft in congested airspace and/or poor weather conditions.

Many of the ground and air avoidance systems are stand-alone systems with no cross-domain correlation of collision avoidance information. As a result, the guidance and collision avoidance information provided by these systems may be contradictory. A pilot that receives contradictory information may be confused and have to respond to a potential collision situation without the use of these aids.

Collision avoidance systems have been improving. For example, U.S. Pat. No. 6,873,269, assigned to the same assignee as the present invention, describes an embedded free flight obstacle avoidance system. The system can filter data produced by ground and air collision avoidance modules, and generate coherent avoidance control guidance. As the data from the collision avoidance systems have been improving, it would be beneficial to present this data to the pilot in a manner that allows the pilot to easily recognize potential obstacles and provides obstacle avoidance guidance.

SUMMARY

A display generator for providing obstacle avoidance guidance to a pilot is described. The display generator includes a means for obtaining air and ground collision avoidance data, a means for obtaining navigation data, a means for obtaining a control signal indicating what information to present on a display, and a processor operable to receive the air and ground collision avoidance data, the navigation data, and the control signal, and generate display image video data that includes symbology representing at least one of a predicted ground collision, a predicted air collision, and an induced collision situation.

The processor receives the air collision avoidance data from a hybrid air collision avoidance module and the ground collision avoidance data from a hybrid ground collision avoidance module. Additionally or alternatively, the processor receives the air and ground collision avoidance data from an obstacle avoidance dispatcher and resolver module. Also, the processor receives the navigation data from a navigation management module and the control signal from a display control panel.

The control signal indicates whether to display information in a mode selected from the group consisting of an obstacle avoidance display mode, a hybrid air collision display mode, and a hybrid ground collision display mode. The obstacle avoidance display mode, the hybrid air collision display mode, and the hybrid ground collision display mode may include a sub-display mode, in which less data is presented on the display.

The symbology may include a solid circle that represents a location of the predicted ground collision, a dotted circle that represents a location of the predicted air collision, and a circle within a circle symbol that represents the induced collision situation. Additionally, the symbology may include a guidance ladder symbol identifying a pathway for an aircraft to follow to avoid an obstacle collision situation.

A method for generating a display depicting an obstacle avoidance situation is also described. The method includes obtaining obstacle avoidance data, filtering the obstacle avoidance data to select data for a predetermined view to be displayed, preparing a terrain elevation image if a ground collision condition is to be displayed, generating a primitive display table for a collision situation, converting data in the primitive display table into a display format suitable for a type of display to be used, and constructing a display presenting the collision situation.

The method may further include determining a display mode. The display mode may be one of an obstacle avoidance display mode, a hybrid air collision display mode, and a hybrid ground collision display mode.

The method may further include computing display time and display rate to a predicted collision condition. The predicted collision condition may be one of a predicted air collision condition and a predicted ground collision condition.

The method may further include determining whether a de-cluster mode is active. If the de-cluster mode is active, an amount of data presented on the display is less than when the de-cluster mode is inactive.

The method may further include determining whether a terrain overlay flag is set. If the terrain overlay flag is set, the display presenting the collision situation depicts an air situation and a ground situation.

The display may include symbology representing a location of one of a predicted ground collision, a predicted air collision, and an induced collision situation. Additionally, the display may include symbology providing guidance to a pilot to avoid an obstacle collision situation.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
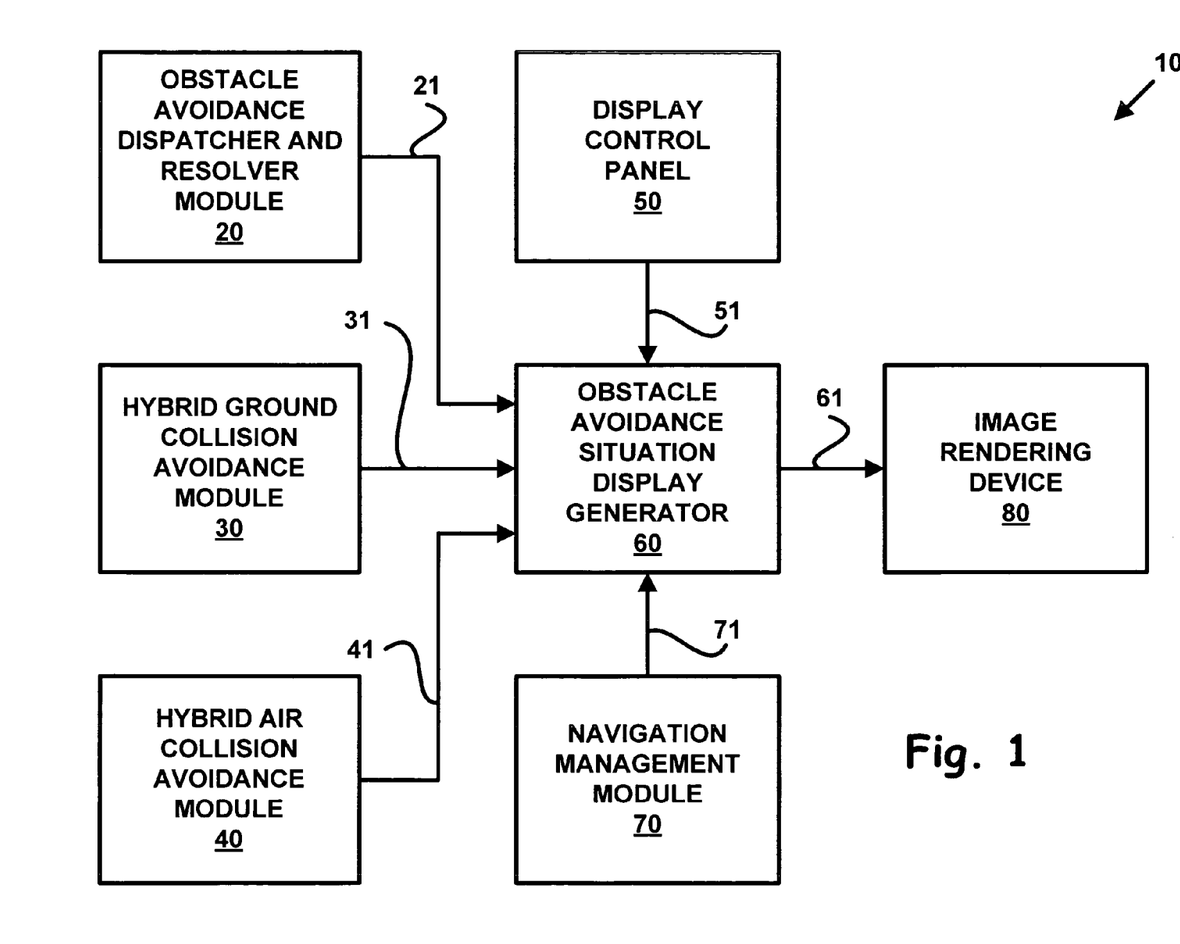
FIG. 1 is a block diagram of an operating environment for an obstacle avoidance situation display generator, according to an example.

FIG. 1 is a block diagram of an operating environment 10 for an obstacle avoidance situation display generator 60. Generally, the display generator 60 receives data from an obstacle avoidance dispatcher and resolver module 20, a hybrid ground collision avoidance module 30, a hybrid air collision avoidance module 40, a display control panel 50, and a navigation management module 70. The display generator 60 provides an output to an image rendering device 80. The image rendering device 80 may be any type of display used in an aircraft, such as a Heads Up Display (HUD), a Heads Down Display (HDD), and a Multipurpose Color Display (MPCD).

The hybrid ground collision avoidance module 30 may be similar to the hybrid ground collision avoidance module described in U.S. patent application Ser. No. 11/019,781, titled "HYBRID GROUND COLLISION AVOIDANCE SYSTEM." The hybrid ground collision avoidance module 30 generates hybrid ground collision situation data 31 by taking into account global air traffic management (GATM) information, terrain data, air data, radar altitude, and/or check data contained in air collision verification data to determine if a conflict exists. If a conflict is determined, the hybrid ground collision avoidance module 30 predicts and generates a suitable solution for ground and specific air avoidance. The hybrid ground collision avoidance module 30 may provide the hybrid ground collision situation data 31 to the display generator 60.

The hybrid ground collision avoidance module 30 may operate in three different modes: the Standby mode, the Hybrid Ground Collision Prediction (HGCP) mode and Hybrid Ground Collision Avoidance (HGCA) mode. To predict ground collision conditions on a continuous basis, the hybrid ground collision avoidance module 30 relies on terrain and features data, ground collision sensor health data, and aircraft navigation state vector and radar data. In the HGCP mode, the hybrid ground collision avoidance module 30 uses air avoidance resolution information contained in air avoidance cross-domain feedback data with the indicative inputs to determine terrain clearance conditions for an indicated air avoidance solution.

The hybrid air collision avoidance module 40 may be similar to the hybrid air collision avoidance module described in U.S. patent application Ser. No. 11/337,212, titled "HYBRID AIR COLLISION AVOIDANCE SYSTEM." The hybrid air collision avoidance module 40 generates hybrid air collision situation data 41 by obtaining aircraft identification (ID), mission identification (MID), aircraft flight number, aircraft type, and aircraft position or relative position (distance, bearing, and pressure altitude) contained in each record of the intruder track file for other aircrafts in the surrounding airspace, and determines air collision conditions. If a conflict is determined, the hybrid air collision avoidance module 40 predicts and generates a suitable solution for air and specific ground avoidance. The hybrid air collision avoidance module 40 may provide the hybrid air collision situation data 41 to the display generator 60.

The hybrid air collision avoidance module 40 may also operate in three modes: the Standby mode, the Hybrid Air Collision Prediction (HACP) mode, and the Hybrid Air Collision Avoidance (HACA) mode. To predict an air collision condition on a continuous basis, the hybrid air collision avoidance module 40 relies on the data contained in direct digital data link, routing digital data link, air collision sensor health data, and aircraft navigation state vector and radar data. In the HACP mode, the hybrid air collision avoidance module 40 uses the ground avoidance solution information contained in the ground avoidance cross-domain feedback data along with the indicative inputs to determine air clearance conditions for an indicated ground avoidance solution.

The obstacle avoidance dispatcher and resolver module 20 may be similar to the obstacle avoidance dispatcher and resolver module described in U.S. Pat. No. 6,873,269, titled "EMBEDDED FREE FLIGHT OBSTACLE AVOIDANCE SYSTEM." The obstacle avoidance dispatcher and resolver module 20 filters data produced by the hybrid ground collision avoidance module 30 and the hybrid air collision avoidance module 40 to provide an obstacle avoidance guidance vector 21. The obstacle avoidance dispatcher and resolver module 20 may provide the obstacle avoidance guidance vector 21 to the display generator 60.

The obstacle avoidance dispatcher and resolver module 20 operates based on the controls and data from avoidance mode controls, and operation and configuration data in dispatching an avoidance solution along with the supportive data produced from one of the hybrid modules 30, 40 and used by the other hybrid module 30, 40. The routing information enables cross-domain verification and validation for an avoidance solution.

An "induced" collision condition may occur if the aircraft is directed to avoid a first obstacle by following a revised flight path, and the revised flight path, if followed, may result in a collision with a second obstacle. If an avoidance solution results in an induced collision condition in the verifying phase, the obstacle avoidance dispatcher and resolver module 20 correlates and provides the originator module 30, 40 with verification feedback: air avoidance cross-domain feedback data for the hybrid ground collision avoidance module 30 and ground avoidance cross-domain feedback data for the hybrid air collision avoidance module 40. If an induced condition is determined, the detailed information of the induced condition is included in the feedback data. The originator module 30, 40 may use the feedback data to generate a more applicable solution, which may comprise either modifying the original solution or generating a new solution.

The obstacle avoidance dispatcher and resolver module 20 monitors the data contained in a ground collision avoidance resolution track file to determine if a predicted ground collision condition exists. If the condition exists, the obstacle avoidance dispatcher and resolver module 20 sends a request along with the data extracted from the ground collision avoidance track file to the hybrid air collision avoidance module 40 to perform verification for an air traffic situation. After determining an air traffic situation for an indicated ground collision avoidance solution, the hybrid air collision avoidance module 40 provides feedback information via an air collision avoidance resolution track file to the obstacle avoidance dispatcher and resolver module 20. The obstacle avoidance dispatcher and resolver module 20 processes the feedback data, which is routed back to the hybrid ground collision avoidance module 30.

Similarly, the obstacle avoidance dispatcher and resolver module 20 checks for compatibility indicators in the ground collision avoidance resolution track file for an air traffic avoidance resolution and then determines appropriate data to send back to the hybrid air collision avoidance module 40 through ground avoidance cross-domain feedback data.

The display control panel 50 manages what and how information may be displayed to a pilot. For example, the display control panel 50 may select to display an image of an obstacle situation with an overlay of flight mode, flight guidance commands, and/or the air and ground avoidance situation to the pilot. The information regarding what is to be displayed may be contained in a display selection signal 51. The display control panel 50 provides the display selection signal 51 to the display generator 60.

The navigation management module 70 calculates aircraft dynamic parameters based on navigation information received from various navigation sensors, such as altimeters, inertial navigation sensors, magnetometers, a global position system, and so on. The navigation management module 70 uses the sensor data to provide best estimates of the aircraft position in terms of latitude, longitude, vertical speed, track angle, and altitude. The estimates are provided in an aircraft navigation vector 71. The navigation management module 70 provides the aircraft navigation vector 71 to the display generator 60.

The obstacle avoidance situation display generator 60 may overlay the obstacle data with map and air traffic data to generate obstacle avoidance display image video data 61. The obstacle avoidance display image video data 61 is provided to the Image Rendering Device 80 for image presentation to the pilot. The obstacle avoidance situation display generator 60 is further described with reference to FIG. 2.

Figure 2:
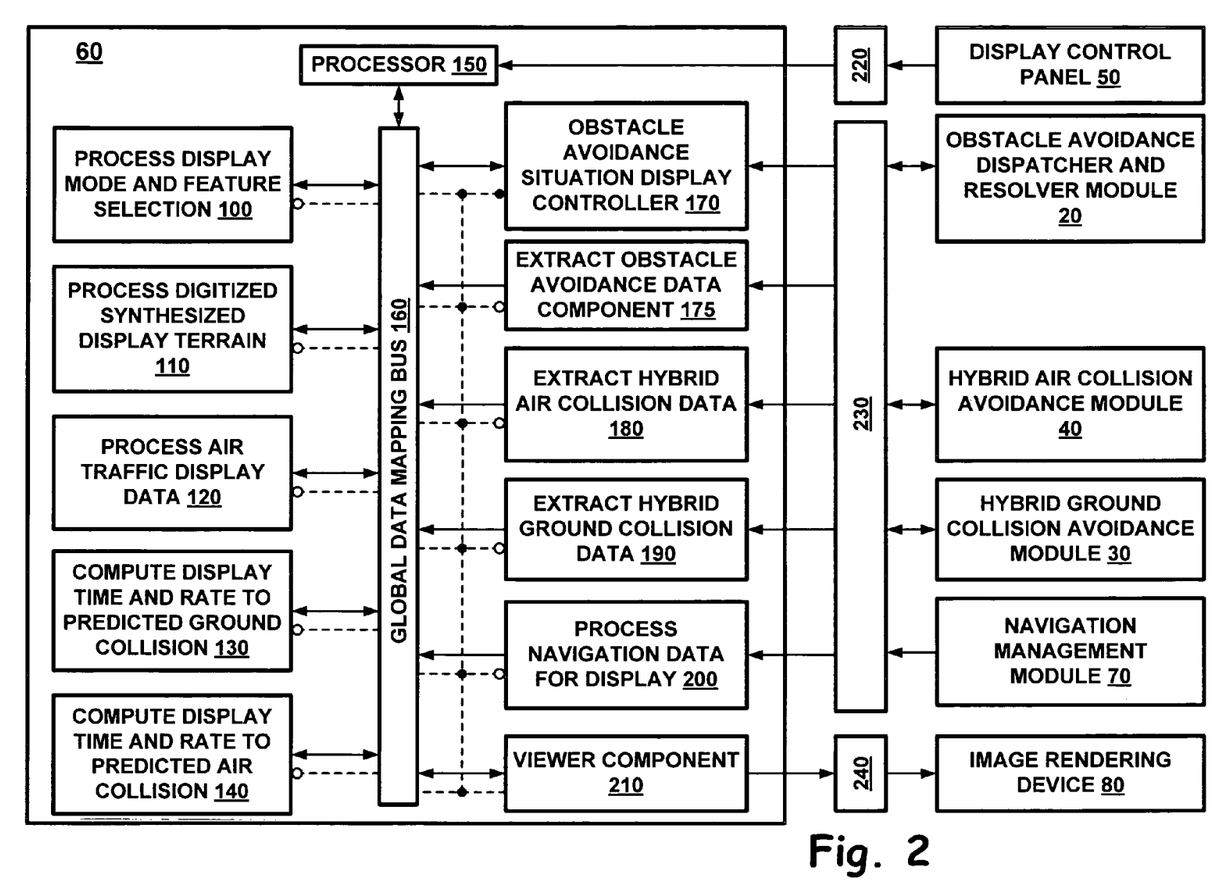
FIG. 2 is a block diagram of the obstacle avoidance situation display generator depicted in FIG. 1, according to an example.

FIG. 2 is a block diagram of the obstacle avoidance situation display generator 60 depicted in FIG. 1. The display generator 60 receives data from the obstacle avoidance dispatcher and resolver module 20, the hybrid ground collision avoidance module 30, the hybrid air collision avoidance module 40, and the navigation management module 70 via an intra-module bus 230. The display generator 60 receives data from the display control panel 50 via an avionics bus 220. The display generator 60 provides the obstacle avoidance display image video data 61 to the image rendering device 80 via a video bus 240.

The avionics bus 220, the intra-module bus 230, and the video bus 240 may be any kind of interconnection between the modules suitable of transferring the various data types. For example, the avionics bus 220 may be an ARINC-429 bus, a MIL-1553B bus, or a high-speed Ethernet bus. Moreover, one or more of the buses 220, 230, 240 may be combined or a separate bus may be used for each module exchanging data with the display generator 60.

The display generator 60 includes a global data mapping bus 160 that handles data transferred between internal components of the display generator 60. Communication is controlled and scheduled for transmitting and receiving by an input/output bus processor 150, which receives the display selection signal 51 from the display control panel 50. The data flow is depicted with the solid lines, while control flow is depicted with the dashed lines. The processor 150 may be any combination of hardware, firmware, and/or software operable to interpret and execute instructions, typically from a software application. For example, the processor 150 may be a microcontroller, a microprocessor, or an application-specific integrated circuit (ASIC).

The display generator 60 includes a set of components designed to perform display feature computations, display data filtering, and image processing and overlaying. Preferably, the components are software components, but may be any combination of hardware, firmware, and/or software. For example, the display generator 60 may include a process display mode and feature selection component 100, a process digitized synthesized display terrain component 110, a process air traffic display data component 120, a compute display time and rate to predicted ground collision component 130, a compute display time and rate to predicted air collision component 140, an obstacle avoidance situation display controller component 170, an extract obstacle avoidance data component 175, an extract hybrid air collision data component 180, an extract hybrid ground collision data component 190, a process navigation data for display component 200, and a merge and construct hybrid display data for obstacle avoidance situation (OAS) viewer component 210.

The number and function of the components in the display generator 60 is provided as an example only. More or less components may be provided in the display generator 60. Additionally, the components may be combined together or further divided into sub-components.

The process display mode and feature selection component 100 periodically evaluates system conditions to determine the active mode and state for the display generator 60. For example, the active modes may include obstacle avoidance display mode, hybrid air collision display mode, and hybrid ground collision display mode. Other active modes may also be possible. The active modes of the display generator 60 are further described with respect to FIGS. 3 and 4.

The process digitized synthesized display terrain component 110 selects the boundaries of terrain to be displayed as a function of current aircraft position, ground speed, and a display range selection. The terrain data may be stored in database. The terrain database may be a database that stores data indexed by geographical location. The process digitized synthesized display terrain component 110 retrieves images from the terrain database based on the aircraft's position as determined by GPS (or other navigation solution) and generates a three-dimensional picture of the terrain, similar to the scenery generated by some video games.

The process air traffic display data component 120 selects the intruder information extracted by the extract hybrid air collision data component 180 based on aircraft position, closure range, ground range, and range selection for the airspace situation for display. The process air traffic display data component 120 determines if a predicted air collision condition exists. If a predicted air collision condition exists, this component 120 extracts a computed avoidance flight path from an air collision avoidance resolution track file, which at least includes maneuver points, avoidance maneuver initiation time, and the type of maneuvers (i.e., target altitude, target vertical speed, thrust command).

The compute display time and rate to predicted ground collision component 130 converts the time calculated by the hybrid ground collision avoidance module 30 to display time and placement on the screen. Similarly, the compute display time and rate to predicted air collision component 140 converts the time calculated by the hybrid air collision avoidance module 40 to display time and placement on the screen.

The obstacle avoidance situation display controller component 170 determines timing and a processing sequence of the other components in the display generator 60. Additionally, the obstacle avoidance situation display controller component 170 performs initialization for data buffers and sets the control signals to a defaulted mode and state after completion of system power-up test.

The extract obstacle avoidance data component 175 collects obstacle avoidance data 21 generated by the obstacle avoidance dispatcher and resolver module 20. The extract hybrid air collision data component 180 collects the hybrid air data 41 generated by the air hybrid collision avoidance module 40. The extract hybrid ground collision data component 190 collects the hybrid ground data 31 generated by the hybrid ground collision avoidance module 30.

The process navigation data for display component 200 collects the navigation data 71, such as aircraft position, aircraft heading, pitch attitude, roll attitude from the navigation management module 70. This information may be used to present symbology on a display that indicates the current and predicted position of the aircraft.

The merge and construct hybrid display data for obstacle avoidance situation (OAS) viewer component 210 converts display data into primitive display tables. Based on the display mode, the viewer component 210 determines whether or not to merge various display images and overlays. The display image data 61 outputted from the viewer component 210 is sent to the video bus 240 and dispatched to the image rendering device 80 for image presentation.

Figure 3:
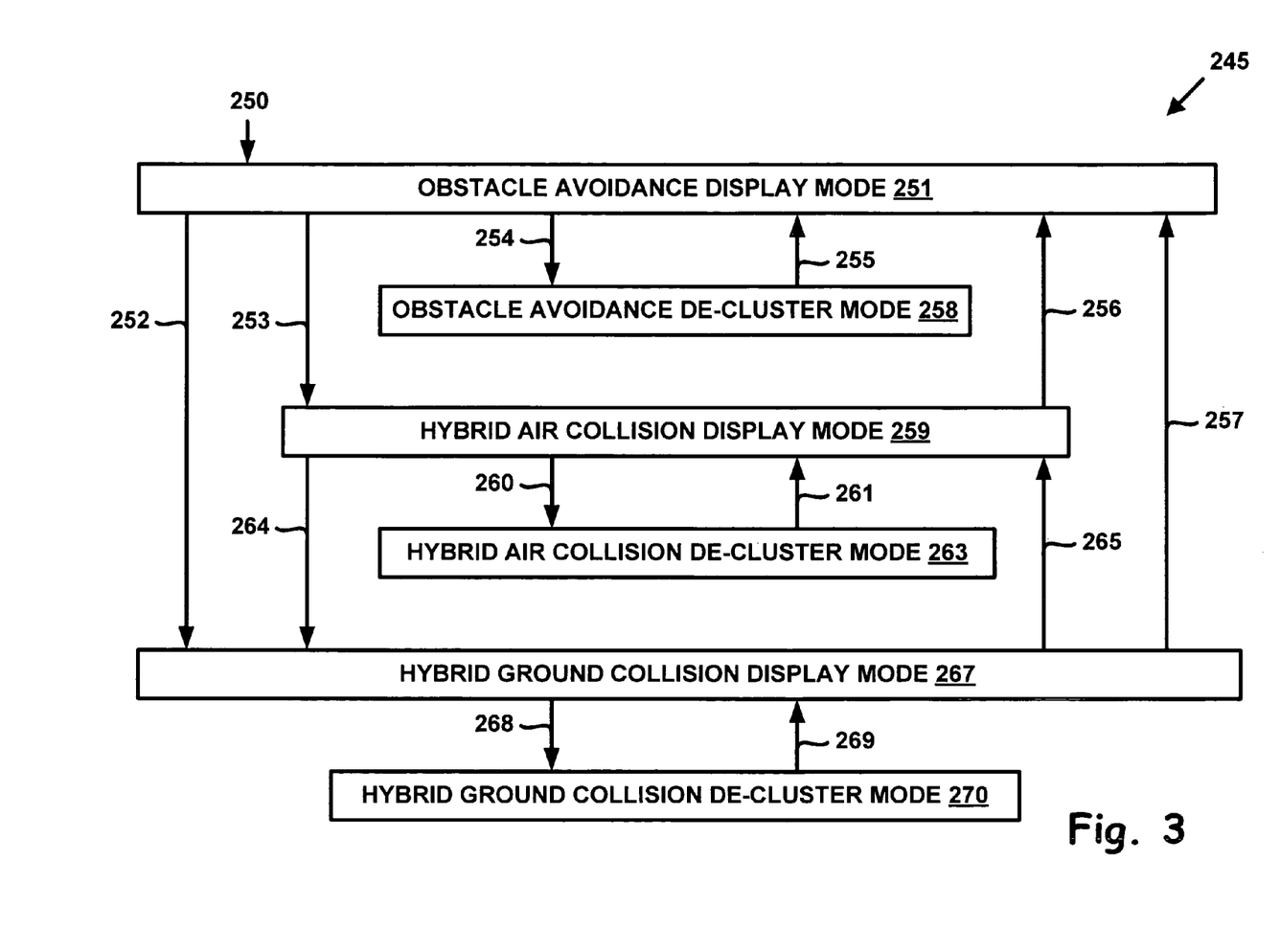
FIG. 3 is a mode transition diagram for the obstacle avoidance situation display generator depicted in FIG. 1, according to an example.
Figure 4A:
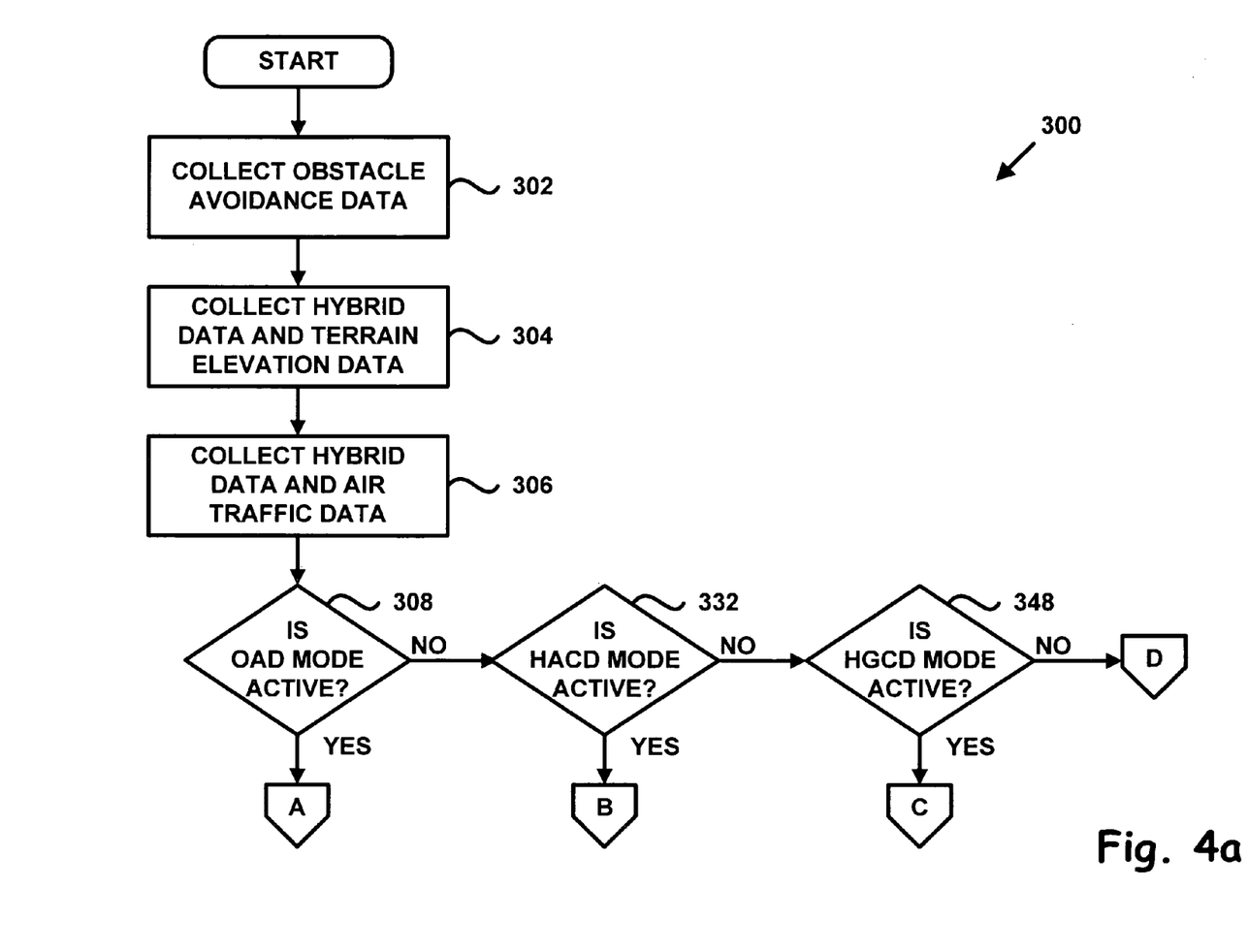
FIG. 4 is a flow diagram showing a method for generating a display by the obstacle avoidance situation display generator depicted in FIG. 1, according to an example.
Figure 4B:
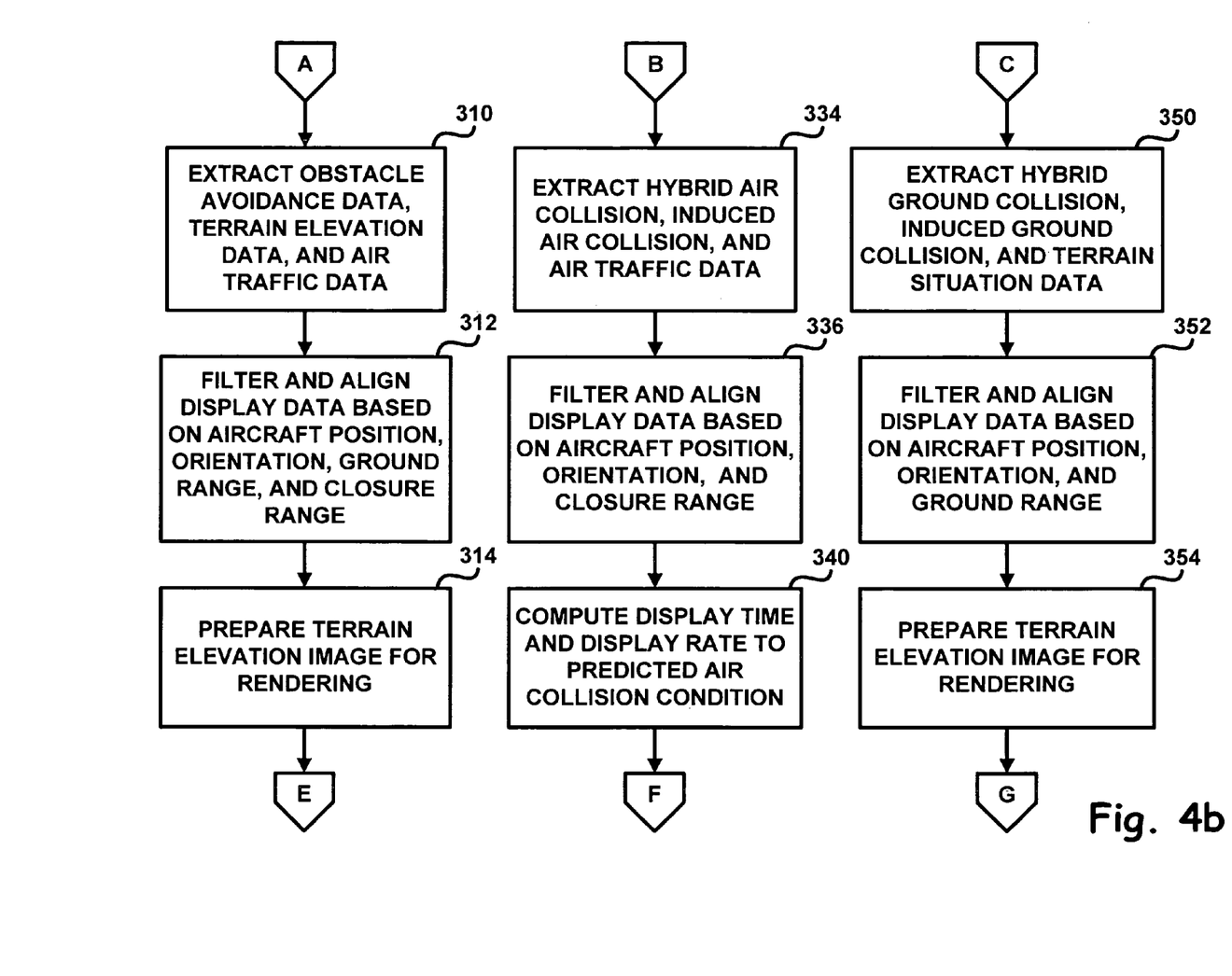
Figure 4C:
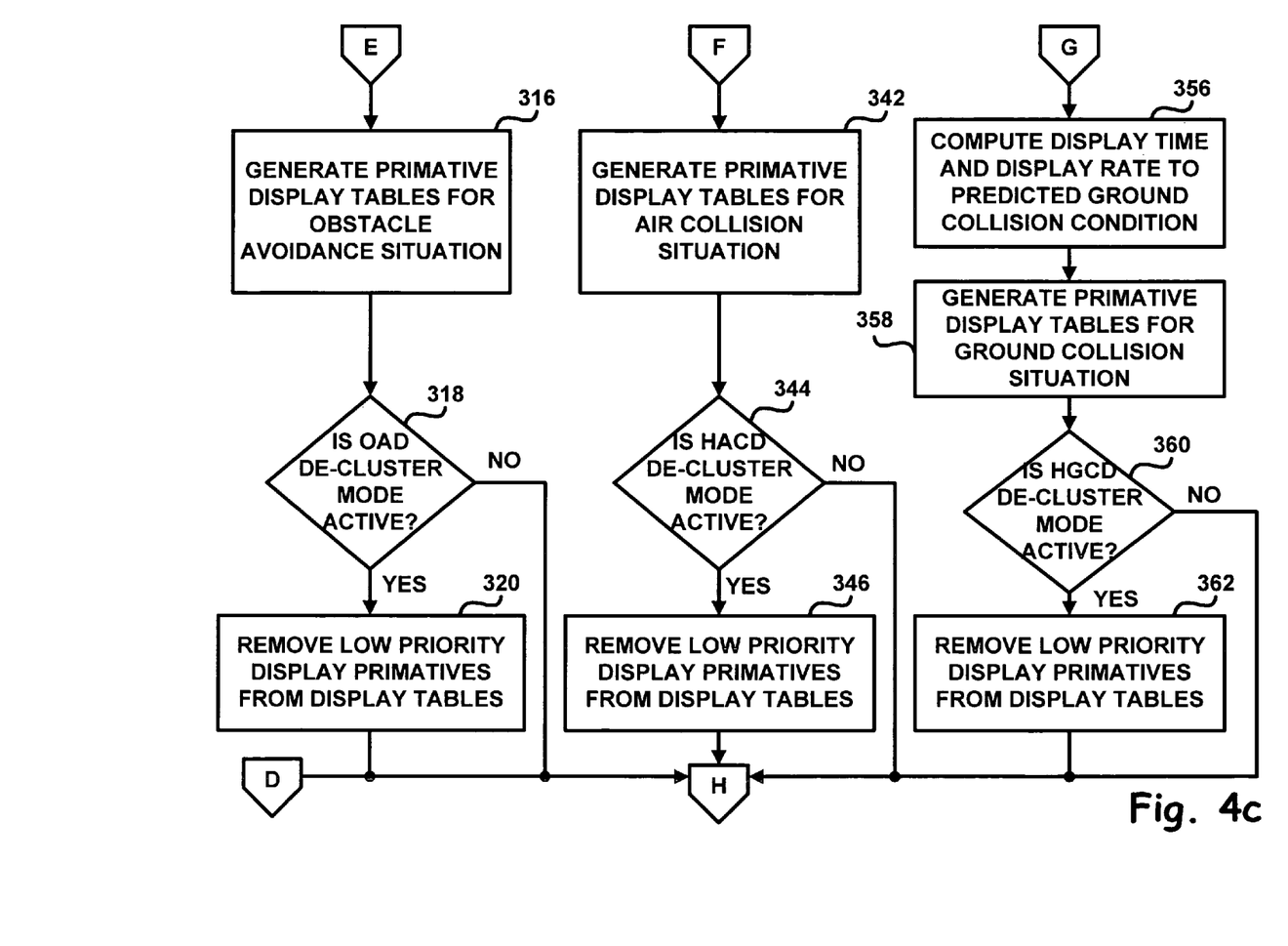
Figure 4D:
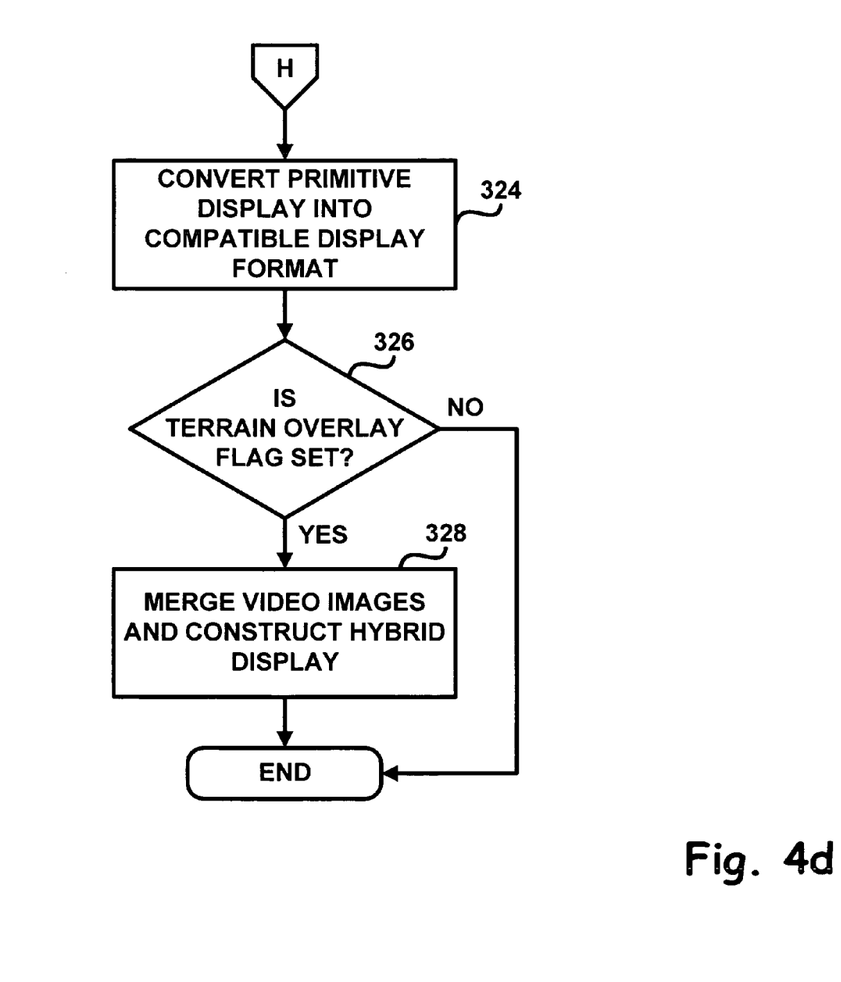

FIG. 3 is a mode transition diagram 245 for the obstacle avoidance situation display generator 60 depicted in FIG. 1. The three main display modes of the display generator 60 are: obstacle avoidance display mode 251, hybrid air collision display mode 259, and hybrid ground collision display mode 267. The default mode is the obstacle avoidance display mode 251. In this mode 251, both ground and air obstacle situations are displayed to the pilot.

The pilot may also chose to operate in the hybrid air collision display mode 259 or the hybrid ground collision display mode 267. Alternatively, the aircraft may automatically select the hybrid air collision display mode 259 or the hybrid ground collision display mode 267. For example, if the terrain database is unavailable, the pilot and/or the aircraft may choose to operate in the hybrid air collision display mode 259. Similarly, if the aircraft is flying low, the pilot and/or the aircraft may choose to operate in the hybrid ground collision display mode 267.

Each display mode 251, 259, 267 has a sub-display mode to minimize the amount of information to be presented for the main mode. The sub-mode for the obstacle avoidance display mode 251 is the obstacle avoidance de-cluster mode 258. The sub-mode for the hybrid air collision display mode 259 is the hybrid air collision de-cluster mode 263. The sub-mode for the hybrid ground collision display mode 267 is the hybrid ground collision de-cluster mode 270.

The de-cluster modes 258, 263, 270 allow the pilot to remove low-priority symbology from the fight display. This may be useful when a pilot is attempting a tricky maneuver and does not want to be overloaded with information. For example, in the de-cluster modes 258, 263, 270 the display generator 60 may not display wind speed symbology, low-level threat symbology, and/or advisory and warning symbology. As a result, the pilot may focus on the symbology that provides the most useful guidance for a particular situation.

At system power-up, after completing system power-up test, and when the display mode select is set to obstacle avoidance mode 250, the display generator 60 is placed in obstacle avoidance display mode 251. From the obstacle avoidance display mode 251, if the de-cluster button on the display control panel 50 is pressed 254, the display generator 60 transitions to the obstacle avoidance de-cluster mode 258. From obstacle avoidance de-cluster mode 258, if the de-cluster button on the display control panel 50 is de-selected 255, the display generator 60 transitions to the obstacle avoidance display mode 251.

From the obstacle avoidance display mode 251, the display generator 60 transitions to the hybrid air collision display mode 259 if display mode select is set to air collision 253. From hybrid air collision display mode 259, if the de-cluster button is pressed 260, the display generator 60 transitions to the hybrid air collision de-cluster mode 263. From the hybrid air collision de-cluster mode 263, the display generator 60 transitions to the hybrid air collision display mode 259 if the de-cluster button is again pressed 261.

From the hybrid air collision display mode 259, the display generator 60 transitions to the obstacle avoidance display mode 251 if display mode select is set to obstacle avoidance display mode 256. From the hybrid air collision display mode 259, the display generator 60 transitions to the hybrid ground collision display mode 267 if display mode select is set to ground collision 264.

From the hybrid ground collision display mode 267, if the de-cluster button is pressed 268, the display generator 60 transitions to the hybrid ground collision de-cluster mode 270. From the hybrid ground collision de-cluster mode 270, the display generator 60 transitions to the hybrid ground collision display mode 267 if the de-cluster button is again pressed 269.

From the hybrid ground collision display mode 267, the display generator 60 transitions to the hybrid air collision display mode 259 if display mode select is set to air collision 265. Also from the hybrid ground collision display mode 267, the display generator 60 transitions to the obstacle avoidance display mode 251 if display mode select is set to obstacle avoidance display mode 257. Additionally from the obstacle avoidance display mode 251, the display generator 60 transitions to the hybrid ground collision display mode 267 if the display mode select is set to ground collision 252.

FIG. 4 is a flow diagram showing a method 300 for generating a display by the obstacle avoidance situation display generator 60. At block 302, the display generator 60 collects obstacle avoidance data generated by the obstacle avoidance dispatcher and resolver module 20. At block 304, the display generator 60 collects hybrid ground data, ground collision prediction data, and terrain elevation data generated by the hybrid ground collision avoidance module 30. At block 306, the display generator 60 collects the hybrid air data, air collision prediction data, and air traffic data generated by the hybrid air collision avoidance module 40.

At block 308, the display generator 60 determines if obstacle avoidance display mode 251 is active. If the obstacle avoidance display mode 251 is active, at block 310 the display generator 60 extracts data pertaining to obstacle collision condition, obstacle avoidance control data, air traffic tracking file, and ground terrain processing data from the obstacle avoidance dispatcher and resolver module 20, the hybrid ground collision avoidance module 30, and the hybrid air collision avoidance module 40.

At block 312, the display generator 60 applies filtering to the extracted data so that only data that fits into the select field of view is displayed. The filtering and alignment of display data is based on current aircraft position, aircraft orientation, air speed, ground speed, ground range to the ground collision condition, and closure range to the air collision condition.

At block 314, the display generator 60 prepares the terrain data frame for display by normalizing terrain elevation data and translating each normalized terrain elevation post to a corresponding color banding code based on color code definition pallet. In addition, the display generator 60 applies sun-shading angle computations to determine the brightness intensity for each elevation post. The color banding data and the brightness data is sent to the graphics video generation hardware along with the aircraft orientation, either heading or track, which enables the graphics hardware to perform image rotation prior to video output converting.

At block 316, the display generator 60 performs translation of the data collected from the obstacle avoidance dispatcher and resolver module 20 to display primitives, and computes displacements for each primitive in the display coordinates. For instance, an intruder aircraft may be converted to a solid triangle with the display location in display coordinates, computed from intruder latitude and longitude position or from distance and bearing angle. The placement of an intruder moving direction tick-mark is determined based on the closure rate computed in hybrid air collision avoidance module 40. If the closure rate is positive, the tick-mark is placed on the line-of-sight and toward the host aircraft. Otherwise, the tick-mark is placed on the line-of-sight and away from the host of the aircraft. The data for instantaneous flight director flight guidance command bars and avoidance pathway on the sky for display are generated directly from predicted obstacle avoidance outer loop guidance that is produced by either the hybrid ground collision avoidance module 30 or the hybrid air collision avoidance module 40.

At block 318, the display generator 60 determines if the obstacle avoidance de-cluster mode 258 is active. If the obstacle avoidance de-cluster mode 258 is active, the display generator 60 removes any display primitives with low priority from the display tables at block 320. If the obstacle avoidance de-cluster mode 258 is inactive or after the low priority display primitives are removed at block 320, the display generator 60 converts display primitives in the display tables to a compatible display format based on a presetting at block 324 to accommodate different aircraft configurations.

At block 326, the display generator 60 determines if a terrain overlay flag is set. If the terrain overlay flag is set, at block 328 the display generator 60 sets a video overlaying switch. As a result of setting the video overlaying switch, the graphics hardware scans two graphics images and then overlays the display primitives over the terrain image to construct a hybrid video image, prior to outputting the video stream onto the video bus 240. If the terrain overlay flag is not set, the method 300 for generating a display constructs a display image composed of only the terrain primitives 316 and the method repeats at block 302 for the next processing frame.

Returning to block 308, if the obstacle avoidance display mode 251 is inactive, the display generator 60 determines if the hybrid air collision display mode 259 is active at block 332. If the hybrid air collision display mode 259 is active, at block 334 the display generator 60 extracts hybrid air collision data including prediction air collision data, induced air collision condition and data, air traffic intruder file along with closure range, range rate, and moving direction (i.e.; away from the host aircraft or toward the host aircraft) from the hybrid air collision avoidance module 40.

At block 336, the display generator 60 filters out any display data falling outside the selected display window. The field of view for the selected display window is based on current aircraft position, aircraft heading orientation, ground range, and closure range. The display generator 60 computes display time and display rate from aircraft to predicted air collision condition at block 340.

At block 342, the display generator 60 generates display primitives to fill the display tables for the air collision situation. At block 344, the display generator 60 determines if the hybrid air collision de-cluster mode 263 is active. If the hybrid air collision de-cluster mode 263 is active, at block 346 the display generator 60 removes low priority display primitives from the display tables. If the hybrid air collision de-cluster mode 263 is inactive or after the low priority display primitives are removed from the display tables at block 346, the display generator 60 converts the display primitives in the display tables to a compatible display format at block 324.

At block 326, the display generator 60 determines if the terrain overlay flag is set. If the terrain overlay flag is set, at block 328 the display generator 60 merges video images to construct the hybrid image display as described previously. If the terrain overlay flag is not set, the method 300 for generating a display constructs a display image composed of only the terrain primitives 316 and the method 300 repeats at block 302 for the next processing frame.

Returning to block 332, if hybrid air collision display mode 259 is inactive, at block 348, the display generator 60 determines if the hybrid ground collision display mode 267 is active. If the hybrid ground collision display mode 267 is active, the display generator 60 extracts hybrid ground collision data including prediction ground collision condition, induced ground collision condition data, and terrain situation data at block 350 from the hybrid ground collision avoidance module 30.

At block 352, the display generator 60 filters any display data falling outside the selected display window based on the field of view of the selected display window. The display generator 60 selects the terrain elevation data inside the display window for display.

At block 354, the display generator 60 converts the terrain elevation data to terrain image ready for rendering as previously described with respect to block 314. To generate the overlay feature data, at block 356 the display generator 60 computes display time and display rate from the aircraft to the predicted ground collision situation. At block 358, the display generator 60 generates display primitives to fill the display tables for ground collision situation.

At block 360, the display generator 60 determines if the hybrid ground collision de-cluster mode 270 is active. If the hybrid ground collision de-cluster mode 270 is active, at block 362 the display generator 60 removes display primitives with low priority from the display tables. If the hybrid ground collision de-cluster mode 270 is inactive or after the low priority display primitives are removed from the display tables at block 362, the display generator 60 converts the display primitives in the display tables to a compatible display format at block 324.

At block 326, the display generator 60 determines if the terrain overlay flag is set. If the terrain overlay flag is set, the display generator 60 merges video images to construct the hybrid image display at block 328 as previously described. If the terrain overlay flag is not set, the method 300 for generating a display constructs a display image composed of only the terrain primitives 316 and the method 300 repeats at block 302 for the next processing frame.

Returning to block 348, if the hybrid ground collision display mode 267 is inactive, the display generator 60 generates a display that does not include obstacle avoidance and hybrid avoidance situation information. The method 300 for generating a display continues at block 324 as previously described.

Figure 5:
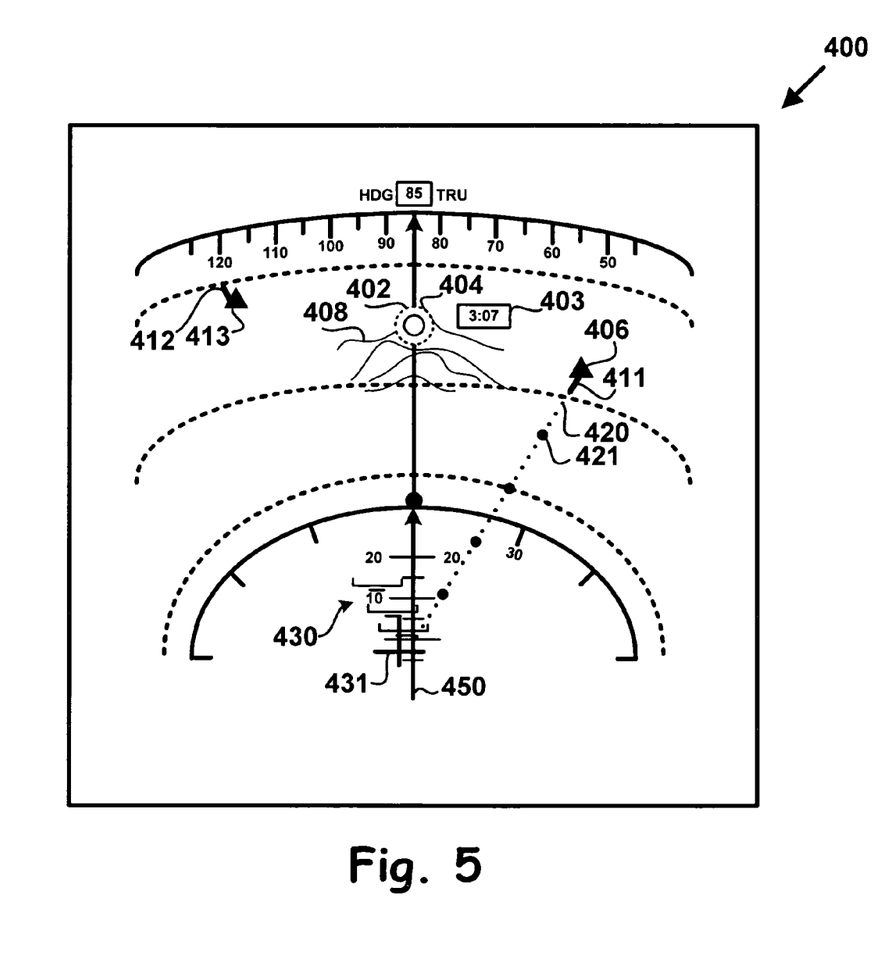
FIG. 5 is a screen shot depicting an example display image generated by the obstacle avoidance situation display generator depicted in FIG. 1.

FIG. 5 is a screen shot depicting an example display image 400 generated by the obstacle avoidance situation display generator 60 depicted in FIG. 1. In this example, the display image 400 depicts a presentation of an air collision with an induced ground collision condition. Intruders from the filtering track file are presented as solid triangles 406, 413 along with moving direction markers 411, 412. The markers 411, 412 indicate whether an intruder is moving towards or away from the aircraft 450.

Terrain elevation contours 408 are presented as a visual aid to the pilot for ground situation awareness. A solid circle symbol 402 is used to indicate the induced collision condition for a predicted air collision. A dotted outer circle symbol 404 is used to indicate the location of a predicted air collision. If an induced collision for a prediction collision condition exists, then a circle within a circle symbol is used to signify this situation. A computed time to a collision symbol 403 is displayed next to the collision condition symbols 402, 404.

An elastic band symbol 420 is used to present a closure range between the intruder 406 and the aircraft 450. Dot symbols 421 located on the band symbol 420 indicate the closure rate between the intruder 406 and the aircraft 450. The guidance ladder symbol 430 is used to present the pathway in the sky that the aircraft 450 may follow to avoid an obstacle collision situation. The flight director bar symbols 431 are used to indicate the flight guidance commands that the aircraft 450 may follow to achieve an obstacle free situation.

Figure 6:
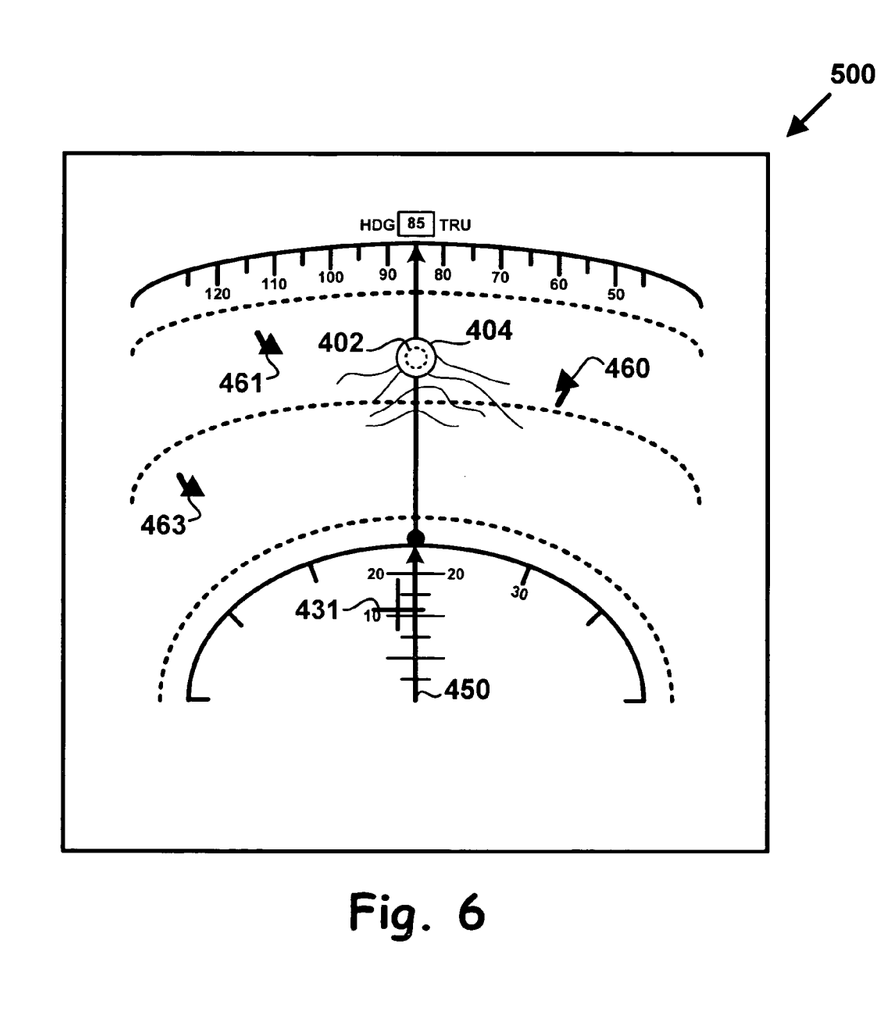
FIG. 6 is a screen shot depicting another example display image generated by the obstacle avoidance situation display generator depicted in FIG. 1.

FIG. 6 is a screen shot depicting an example display image 500 generated by the obstacle avoidance situation display generator 60 depicted in FIG. 1. In this example, the display image 500 depicts a presentation of a ground collision with an induced air collision condition. Intruders from the filtering track file are presented as solid triangles 460, 461, 463 with moving direction marker symbols to indicate whether the intruder is moving towards or away from the host aircraft 450. The solid circle symbol 404 is used to indicate the location of a predicted ground collision, while the dotted circle symbol 402 is used to indicate the induced collision condition for a predicted ground collision. The circle within a circle symbol is used to signify an induced collision condition.

Figure 7:
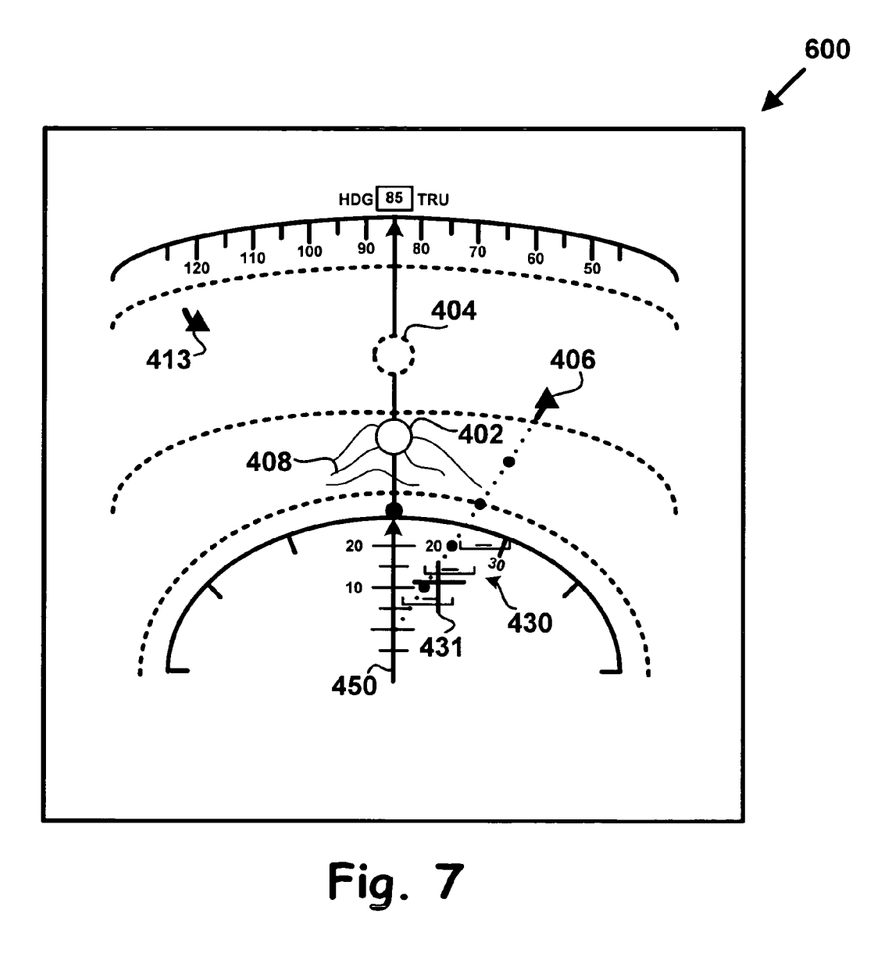
FIG. 7 is a screen shot depicting another example display image generated by the obstacle avoidance situation display generator depicted in FIG. 1.

FIG. 7 is a screen shot depicting an example display image 600 generated by the obstacle avoidance situation display generator 60 depicted in FIG. 1. In this example, the display image 600 depicts detection of both an air collision and a ground collision existing with the current flight path. As seen in FIG. 7, the solid circle symbol 402, which is used to indicate the location of a predicted ground collision, does not form a circle within a circle symbol with the dotted circle symbol 404, which is used to indicate the location of a predicted air collision.

While FIGS. 5-7 provide some example display images, it is understood that many situations may be depicted on the flight display. Moreover, the example symbology described may be modified, including adding new symbology, changing the shape of the symbology as described, or removing symbology. Additionally, the symbology may be presented in a variety of colors so as to provide additional guidance to the pilot.

By providing display symbology indicating an unambiguous obstacle avoidance situation in addition to providing obstacle control and guidance, the pilot may manually maneuver the aircraft into a free obstacle situation or monitor the progression of the aircraft as it automatically maneuvers to avoid an obstacle situation. The display generator 60 filters the data to provide high fidelity of the obstacle situation reflecting the operating envelope of the aircraft and the obstacle avoidance related equipment on-board the aircraft. Additionally, the display generator 60 is capable of processing hybrid data produced by hybrid engines for obstacle avoidance situation and guidance display. Further, the display generator 60 is capable of presenting an induced collision condition, whether induced ground collision or induced air collision, to the flight crew to fully aware of the dynamics of avoidance planning.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

I claim:

1. A display generator comprising:
   an air collision data component configured to receive air collision avoidance data;
   a ground collision data component configured to receive ground collision avoidance data, wherein at least one of the air collision data component or the ground collision data component is configured to receive a proposed flight path calculated to avoid a predicted air collision or a predicted ground collision that, if followed, would cause a separate collision;
   a navigation data component configured to receive navigation data; and
   a processor configured to receive a control signal indicating what information to present on a display and generate image video data based on the air collision avoidance data, the ground collision avoidance data, the navigation data, and the control signal, wherein the image video data includes symbology representing an induced collision situation based on the proposed flight path, wherein the processor is further configured to present the image video data on the display.

2. The display generator of claim 1, wherein the air collision data component receives the air collision avoidance data from a hybrid air collision avoidance module.

3. The display generator of claim 1, wherein the ground collision data component receives the ground collision avoidance data from a hybrid ground collision avoidance module.

4. The display generator of claim 1, wherein the air collision data component receives the air collision avoidance data from an obstacle avoidance dispatcher and resolver module and the ground collision data component receives the ground collision avoidance data from the obstacle avoidance dispatcher and resolver module.

5. The display generator of claim 1, wherein the navigation data component receives the navigation data from a navigation management module.

6. The display generator of claim 1, wherein the display component receives the control signal from a display control panel.

7. The display generator of claim 1, wherein the control signal indicates whether to display information in an obstacle avoidance display mode, a hybrid air collision display mode, or a hybrid ground collision display mode.

8. The display generator of claim 7, wherein each of the obstacle avoidance display mode, the hybrid air collision display mode, and the hybrid ground collision display mode includes a sub-display mode, wherein relatively less data is presented on the display in each of the sub-display modes than in each of the display modes.

9. The display generator of claim 1, wherein the symbology includes at least one of a solid circle that represents a location of the predicted ground collision, a dotted circle that represents a location of the predicted air collision, or a circle within a circle symbol that represents the induced collision situation.

10. The display generator of claim 1, wherein the symbology includes a guidance ladder symbol identifying a pathway for an aircraft to follow to avoid an obstacle collision situation.

11. A method for generating a display depicting an induced collision situation, the method comprising:
    receiving air and ground collision avoidance data, navigation data, and a control signal indicating selected information to present on a display;
    receiving a proposed flight path calculated to avoid a predicted air collision or a predicted ground collision that, if followed, would cause a separate collision;
    generating image video data based on the air and ground collision avoidance data, the navigation data, and the control signal, wherein the display image video data includes symbology representing an induced collision situation based on the proposed flight path; and
    displaying the image video data on the display.

12. The method of claim 11, further comprising selecting a display mode based on the control signal, wherein the display mode comprises an obstacle avoidance display mode, a hybrid air collision display mode, or a hybrid ground collision display mode.

13. The method of claim 11, further comprising computing time and rate to a predicted collision condition.

14. The method of claim 13, wherein the predicted collision condition comprises a predicted air collision condition or a predicted ground collision condition.

15. The method of claim 11, wherein the symbology further comprises symbology representing a predicted ground collision or a predicted air collision.

16. The method of claim 12, wherein each of the obstacle avoidance display mode, the hybrid air collision display mode, and the hybrid ground collision display mode includes a sub-display mode, wherein relatively less data is presented on the display in each of the sub-display modes than in each of the display modes.

17. The method of claim 11, wherein the symbology includes a guidance ladder symbol identifying a pathway for an aircraft to follow to avoid an obstacle collision situation.

18. The method of claim 11, wherein the symbology further includes at least one of a solid circle that represents a location of the predicted ground collision, a dotted circle that represents a location of the predicted air collision, or a circle within a circle symbol that represents the induced collision situation.

\* \* \* \* \*